United States Patent [19]

Lee

[11] Patent Number: 5,364,121
[45] Date of Patent: Nov. 15, 1994

[54] REAR SUSPENSION FOR VEHICLE HAVING INCREASED FREE LAYOUT

[75] Inventor: Unkoo Lee, Kyungki, Rep. of Korea

[73] Assignee: Hyundai Motor Company, Seoul, Rep. of Korea

[21] Appl. No.: 109,262

[22] Filed: Aug. 20, 1993

[30] Foreign Application Priority Data

Aug. 20, 1992 [KR] Rep. of Korea ............ 92-14975

[51] Int. Cl.⁵ .................................................. B06G 1/00
[52] U.S. Cl. ................................... 280/688; 280/725; 280/690
[58] Field of Search ............... 280/688, 725, 690, 701, 280/700, 697

[56] References Cited

U.S. PATENT DOCUMENTS

| | | | |
|---|---|---|---|
| 2,815,221 | 12/1957 | Peras .................................. | 280/725 |
| 2,845,134 | 7/1958 | Reimspiess ......................... | 280/700 |
| 3,201,143 | 8/1965 | Duong ................................. | 280/725 X |
| 4,334,696 | 6/1982 | Bergstrom .......................... | 280/725 |
| 4,453,737 | 6/1984 | Burchard et al. ................... | 280/725 |
| 4,537,420 | 8/1985 | Ito et al. ............................. | 280/690 X |
| 4,715,615 | 12/1987 | Kijima et al. ....................... | 280/690 X |
| 4,911,467 | 3/1990 | Alesso et al. ....................... | 280/690 |
| 5,005,856 | 4/1991 | Shibahata .......................... | 280/688 |
| 5,009,449 | 4/1991 | Edahiro et al. ..................... | 280/690 |
| 5,037,127 | 7/1991 | Lin ..................................... | 280/688 X |

Primary Examiner—Kenneth R. Rice
Assistant Examiner—Christopher P. Ellis
Attorney, Agent, or Firm—Birch, Stewart, Kolasch & Birch

[57] ABSTRACT

A rear suspension for a vehicle including an axle beam transversely arranged with respect to a car body where wheels are mounted on both ends of the axle beam; trailing arms projecting forward from both ends of the axle beam, the trailing arm's front end portion with respect to the car body being connected to the car body; upper and lower control links connecting a front end of the trailing arm to the car body, the upper and lower control links having an interval therebetween; and spring-damper assemblies mounted perpendicularly at both ends of the axle beam, an upper portion of each spring-damper assembly being connected to the car body, wherein optimal geometric characteristics are realized by easily determining a variation of a wheel base and anti-lift and anti-squat characteristics.

12 Claims, 3 Drawing Sheets

REAR SUSPENSION FOR VEHICLE HAVING INCREASED FREE LAYOUT

BACKGROUND OF THE INVENTION

1. Field of the Invention

The present invention relates to a rear suspension for a vehicle and, more particularly, to a rear suspension which is capable of obtaining an optimal geometric characteristic such that a free lay out degree for establishing a trailing arm mounting position can be increased to easily establish anti-lift and anti-squat characteristics, and a variable condition of a wheel base.

2. Description of Related Art

A conventional suspension for a vehicle connects an axle shaft and a car body to each other, and controls a position of a tire with respect to the car body for its ideal position during running of the vehicle. Thus, optimal handling safety may be obtained and the axle shaft is prevented from directly transmitting an impact or vibration from a road surface to the car body. The suspension also prevents damage of baggage, thereby improving riding comfort.

A conventional rear suspension for vehicle having a trailing arm is illustrated in FIG. 4, in which a wheel 51 is mounted on both ends of an axle beam 50 transversely arranged with respect to the car body 53, a front end of a trailing arm 52 projecting from both ends of the axle beam forward is connected to the car body, and an absorbing means 54 connects the axle beam 50 to the car body 53.

In the above described suspension, when a vibration generated from the road surface is transmitted to the wheel 51, the trailing arm 52 pivots around its front end of the connecting portion 55 as a center and the vibration is then absorbed by the absorbing means 54.

However, in the above conventional suspension, once the position of the connecting portion 55 of the trailing arm is determined, since the up-down tracing movement M of the wheel 51 is determined in accordance with the trailing arm's length and position of the connecting portion 55, and then anti-lift and anti-squat characteristics as well as variation of a wheel base are automatically determined, the suspension has many restrictions in its design for obtaining the variable and pertinent geometric characteristics.

That is to say, the suspension has to be designed within a limited space due to design of the car body. Because of this limitation, to obtain the pertinent mechanical characteristics, if the connecting portion 55 of the trailing arm 52 is to be formed at a lower position, it has a bad effect on road clearance. If the connecting portion 55 of the trailing arm 52 is to be formed at a higher position, there are some interferences with the floor of the vehicle. Therefore, this suspension is limited in its design whereby this suspension can not make the best use of geometric characteristics.

SUMMARY OF THE INVENTION

Therefore, the present invention has been made in an effort to solve the above-described problems of the conventional suspension.

The primary object of the present invention is to provide a suspension for a vehicle which can increase a free lay out degree about the mounting position of a trailing arm.

Another object of the present invention is to provide a suspension which can obtain optimal geometric characteristics by easily determining a variation of a wheel base and anti-lift and anti-squat characteristics.

To achieve the above objects, the present invention provides a rear suspension for a vehicle comprising: an axle beam transversely arranged with respect to the car body where wheels are mounted on both ends of the axle beam; trailing arms projecting forward from both ends of the axle beam, said trailing arm's front end portion with respect to the car body being connected to the car body; upper and lower control links connecting a front end of the trailing arm to the car body, said upper and lower control links having a predetermined interval between each other; and spring-damper assemblies mounted perpendicularly at the both ends of the axle beam, said each spring-damper assembly's upper portion with respect to the car body being connected to the car body.

The above and further objects, details and advantages of the present invention will become apparent from the following detailed description of a preferred embodiment thereof, when read in conjunction with the accompanying drawings.

DETAILED DESCRIPTION OF PREFERRED EMBODIMENTS

Figure 1:
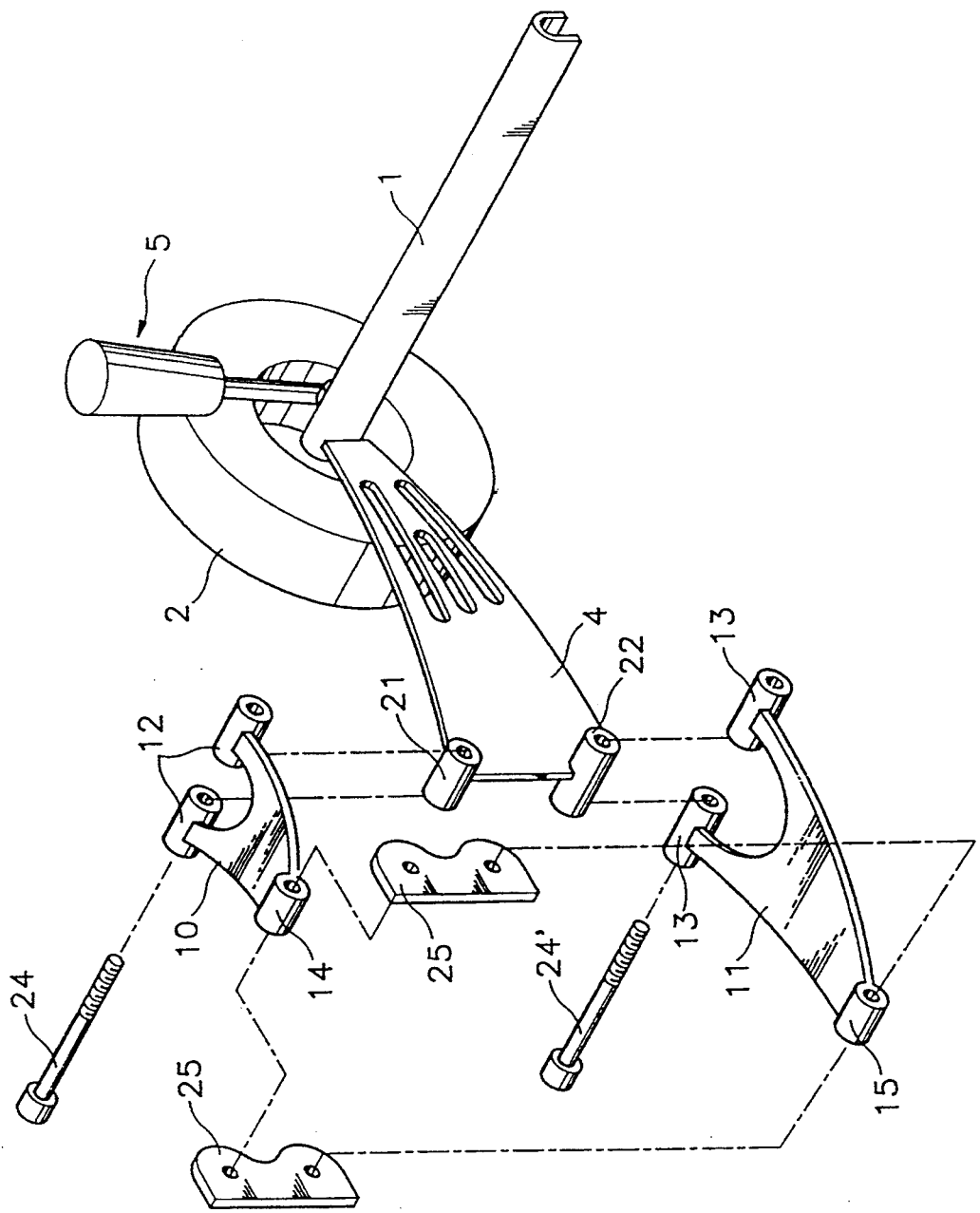
FIG. 1 is a perspective view of a suspension according to a first embodiment of the present invention.

FIG. 1 is a perspective view of a suspension according to the first embodiment of the present invention, wherein the suspension includes an axle beam 1 transversely arranged with respect to a car body and a wheel 2 mounted on both ends thereof; a trailing arm 4 projecting forward from the axle beam 1 and having a front end portion connected to the car body; a pair of spring-damper assemblies 5 perpendicularly mounted at both ends of the axle beam 1 and having an upper end portion connected to the car body.

The trailing arm 4 is not directly connected to the car body but is connected to the car body by means of upper and lower control links 10 and 11, respectively.

That is to say, the front end of the trailing arm 4 is formed with upper and lower portions having a predetermined interval therebetween, and rear ends of the upper and lower control links 10 and 11 are pivotally connected to the upper and lower portions of the front end of the trailing arm, respectively.

To pivotally couple the links 10 and 11 with the front end of the trailing arm 4, upper and lower pairs of coupling portions 12 and 13 are, respectively, formed at the rear ends of the upper and lower control links, and pivot joint portions 21 and 22 are integrally formed at the upper and lower portions of the front end of the trailing arm 4, respectively.

The coupling portions 12 and 13 are pivotally coupled to each pivot joint portion 21 and 22 by means of hinge bolts 24 and 24'.

Figure 2:
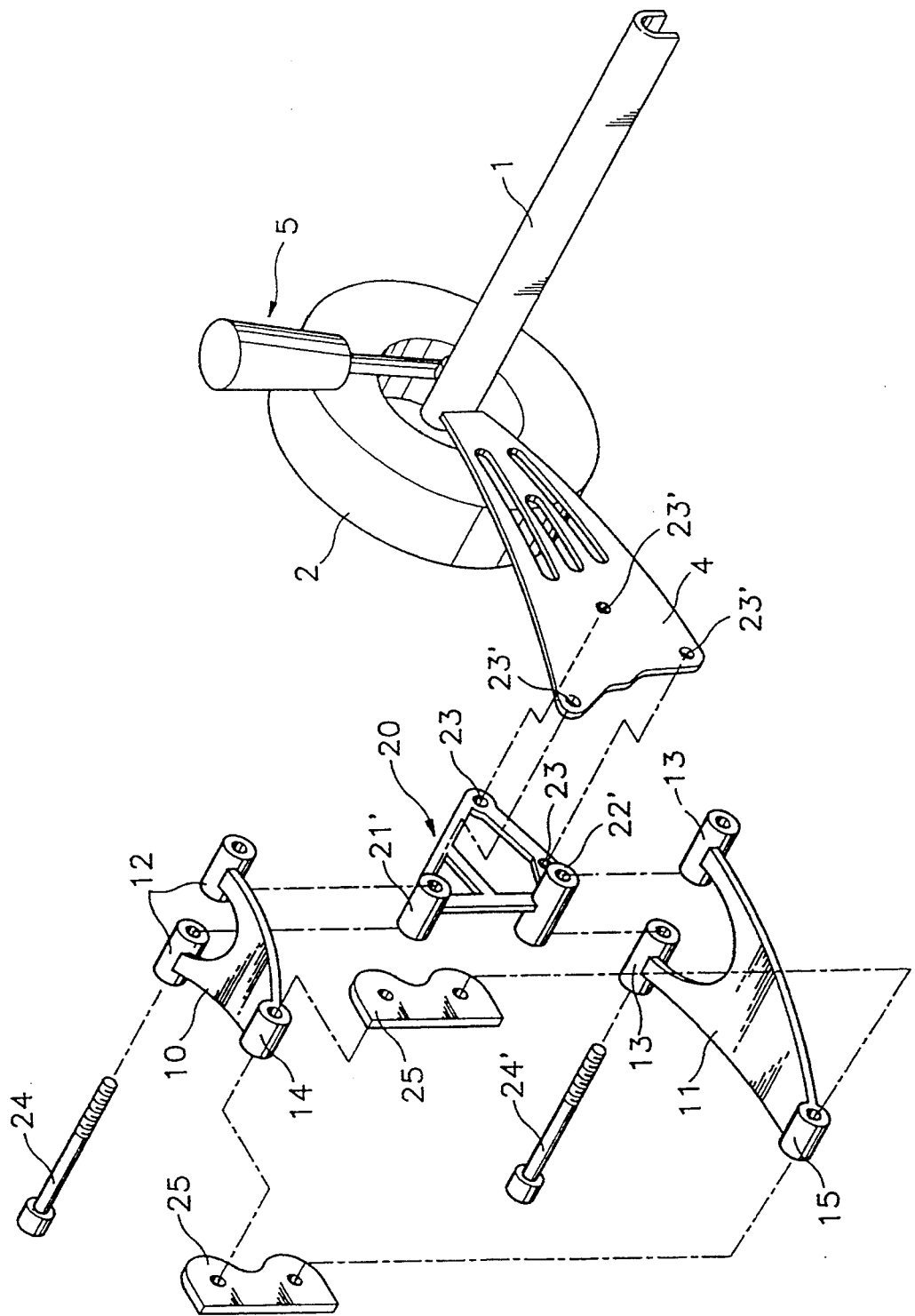
FIG. 2 is a perspective view of the suspension according to a second embodiment of the present invention.

In another embodiment of the present invention, as shown in FIG. 2, taking into account a hardness of the trailing arm, it may be desirable to use a special connecting means 20 for connecting the control links 10 and 11 to the trailing arm 4.

The connecting means 20 includes a pivot joint portion 21' pivotally coupled with the coupling portion 12 of the rear end portions of the upper control link 10, a pivot joint portion 22' pivotally coupled to the coupling portion 13 of the rear end of the lower control link 11, and a plurality of holes 23 which are, respectively, coupled with a hole 23' formed at the front end of the trailing arm 4 by a bolt (not shown).

Further, the front end coupling portion 14 and 15 of each upper and lower control link 10 and il is coupled with a mounting bracket 25 mounted on the car body as also occurs in the embodiment of FIG. 1.

In the above-described embodiments of the present invention, a longitudinal length of the upper control link 10 is less than that of the lower control link 11. An interval D between the front end coupling portion 14 of the upper control link 10 and the front end coupling portion 15 of the lower control link 11 is narrower than that between the rear end coupling portion 12 of the upper control link 10 and the rear end coupling portion 13 of the lower control link 11 (see FIG. 3).

Figure 3:
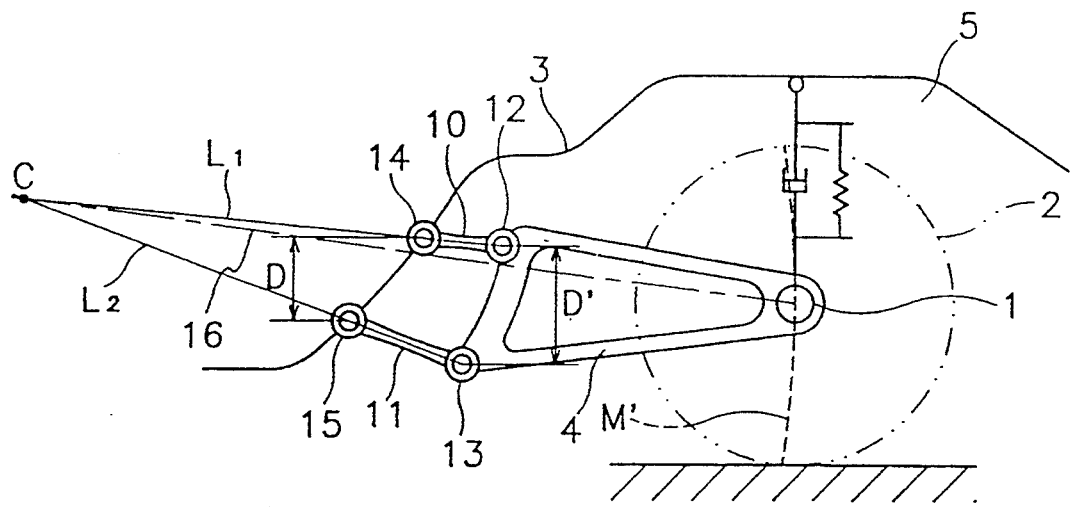
FIG. 3 is a side view of the suspension according to the present invention.
Figure 4:
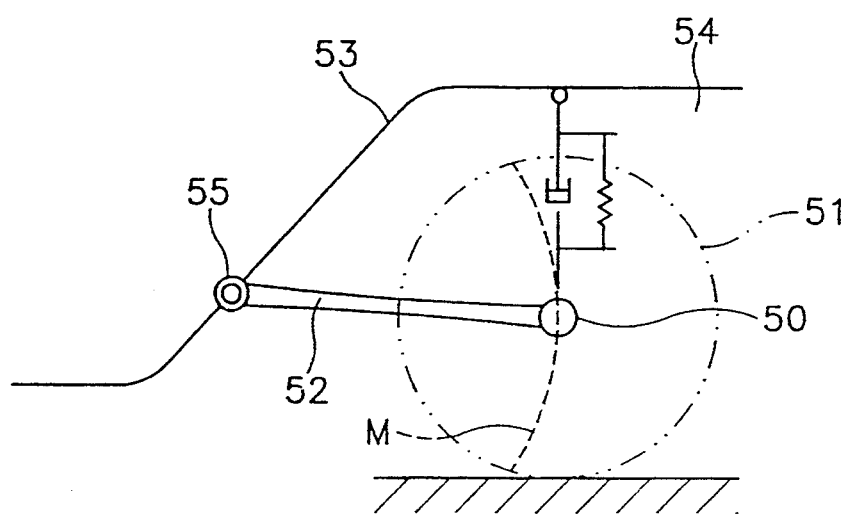
FIG. 4 is a side view of a suspension according to a conventional device.

As described above, since the suspension of the present invention is connected to the car body via the upper and lower control links spaced from each other, while the trailing arm of the conventional device is directly connected to the car body, as shown in FIG. 3, a nominal mounting point C is formed at an intersecting point of an extension line L1 of the coupling portions 12 and 14 and an extension line L2 of the coupling portions 12 and 13. Thus, the suspension of the present invention has a nominal trailing arm 16 which connects the nominal mounting point C to a center of the axle beam 1.

Accordingly, when the up-down vibration is transmitted to the wheel from the road surface, the wheel 2 is moved up and down according to the moving trace M' on the basis of the nominal mounting point C of a base point of the nominal trailing arm 16.

In the above-described suspension according to the present invention, an inclination and length of the nominal trailing arm 16 can be freely controlled according to the variation of the intervals D and D' between the upper and lower control links 10 and 11, so that the nominal mounting point C may be varied according to the coupling condition.

Accordingly, the anti-lift and anti-squat characteristics and variation of the wheel base which is varied by variation of the length of the trailing arm 4 can be adequately established to meet the most optimal geometric characteristics.

Although preferred embodiments of the present invention have been described in detail hereinabove, it should be clearly understood that many variations and/or modifications of the basic inventive concepts herein taught which may appear to those skilled in the pertinent art will still fall within the spirit and scope of the present invention, as defined in the appended claims.

What is claimed is:

1. A rear suspension for a vehicle comprising:
   an axle beam transversely arranged with respect to a car body and including wheels mounted on both ends of said axle beam;
   a trailing arm projecting forward form said axle beam, said trailing arm having a front end portion connected to the car body;
   upper and lower control links connecting the front end portion of said trailing arm to the car body, said upper and lower control links having a predetermined spacing therebetween, wherein an interval between the front end coupling portion of the upper control link and the front end coupling portion of the lower control link is narrower than that between the rear end coupling portion of the upper control link and the rear end coupling portion of the lower control link; and
   spring-damper assemblies mounted perpendicularly to both ends of said axle beam, an upper portion of said spring-damper assemblies being connected to the car body.

2. The rear suspension for a vehicle as claimed in claim 1, wherein said upper control link includes a rear end coupling portion pivotally coupled to an upper portion of the front end portion of said trailing arm and a front end coupling portion pivotally coupled to the car body; and
   wherein said lower control link includes a rear end coupling portion pivotally coupled to a lower portion of the front end portion of said trailing arm and a front end coupling portion pivotally coupled to the car body.

3. The rear suspension for a vehicle as claimed in claim 1, wherein each rear end coupling portion of the upper and lower control links is pivotally coupled to a connecting means mounted on the front end portion of said trailing arm.

4. The rear suspension for a vehicle as claimed in claim 2, wherein each rear end coupling portion of the upper and lower control links is pivotally coupled to a connecting means mounted on the front end portion of said trailing arm.

5. The rear suspension for a vehicle as claimed in claim 2, wherein each rear end coupling portion of the upper and lower control links is pivotally linked to a mounting bracket mounted on the car body.

6. The rear suspension for a vehicle as claimed in claim 3, wherein the connecting means includes an upper pivot joint portion coupled to the rear end coupling portion of said upper control link by a bolt, a lower pivot joint portion coupled to the rear end coupling portion of said lower control link by a bolt, and plurality of holes coupled to a corresponding plurality of holes formed on the front end portion of said trailing arm by means of a bolt.

7. The rear suspension for a vehicle as claimed in claim 4, wherein the connecting means includes an upper pivot joint portion coupled to the rear end coupling portion of said upper control link by a bolt, a lower pivot joint portion coupled to the rear end coupling portion of said lower control link by a bolt, and plurality of holes coupled to a corresponding plurality of holes formed on the front end portion of said trailing arm by means of a bolt.

8. The rear suspension for a vehicle as claimed in claim 1, wherein a longitudinal length of the upper control link is less than that of the lower control link.

9. A rear suspension for a vehicle comprising:
   an axle beam transversely arranged with respect to the car body and including wheels mounted on both ends of said axle beam;
   a trailing arm projecting forward from said axle beam and integrally forming upper and lower pivot joint portions on a front end portion of said trailing arm connected to the car body;

upper and lower control links connecting a front end of said trailing arm to the car body, said upper and lower control links having a predetermined interval therebetween wherein an interval between the front end coupling portion of the upper control link and the front end coupling portion of the lower control link is narrower than that between the rear end coupling portion of the upper control link and the rear end coupling portion of the lower control link; and spring-damper assemblies mounted perpendicularly to both ends of said axle beam, an upper portion of said spring-damper assemblies being connected to the car body.

10. The rear suspension for a vehicle as claimed in claim 9, wherein said upper control link includes a rear end coupling portion pivotally coupled to an upper portion of the front end portion of said trailing arm and a front end coupling portion pivotally coupled to the car body, and wherein said lower control link includes a rear end coupling portion pivotally coupled to a lower portion of the front end portion of said trailing arm and a front end coupling portion pivotally coupled to the car body.

11. The rear suspension for a vehicle as claimed in claim 10, whrein each rear end coupling portion of the upper and lower control links is pivotally linked to a mounting bracket mounted on the car body.

12. The rear suspension for a vehicle as claimed in claim 9, wherein a longitudinal length of the upper control link is longer than that of the lower control link.

* * * * *